United States Patent [19]

Brown et al.

[11] 4,277,874
[45] Jul. 14, 1981

[54] AIR FILTRATION BAG REPLACEMENT DEVICE

[76] Inventors: Michael D. Brown, 27011 Nudgent; Kenneth A. Brown, P.O. Box 402, both of Boron, Calif. 93516

[21] Appl. No.: 75,764

[22] Filed: Sep. 17, 1979

[51] Int. Cl.³ .............................................. B23P 19/02
[52] U.S. Cl. ...................................... 29/235; 269/131
[58] Field of Search .......................... 29/235; 248/101; 24/255 SL; 269/130, 131, 132; 53/257, 258, 260, 261

[56] References Cited

U.S. PATENT DOCUMENTS

| | | | |
|---|---|---|---|
| 2,155,705 | 4/1939 | Gottwald | 269/131 |
| 2,758,764 | 8/1956 | Plazze | 226/59 |
| 2,998,629 | 9/1961 | Smith | 269/131 |

FOREIGN PATENT DOCUMENTS 446817 2/1948 Canada .
213825 6/1941 Switzerland .

Primary Examiner—James L. Jones, Jr.
Attorney, Agent, or Firm—Townsend and Townsend

[57] ABSTRACT

Apparatus for facilitating the insertion of a cylindrical frame into a filter bag used for collecting airborne particulate matter is disclosed. A cylindrical member is provided which has an axial discontinuity in its sidewalls. The outer diameter of the cylindrical member is at least equal to the inner diameter of the mouth of the bag. The inner diameter of the cylindrical member is no less than the outer diameter of the frame. A device is provided for drawing the sidewalls of the cylindrical member together at the discontinuity so that the outer diameter of the cylindrical member is decreased to slightly less than the inner diameter of the mouth of the bag. The mouth of the bag is then inserted over the end of the cylindrical member, which is released to capture the mouth of the bag. With the mouth of the bag held open by the apparatus of the present invention, the frame can readily be inserted through the other end of the cylindrical member.

2 Claims, 4 Drawing Figures

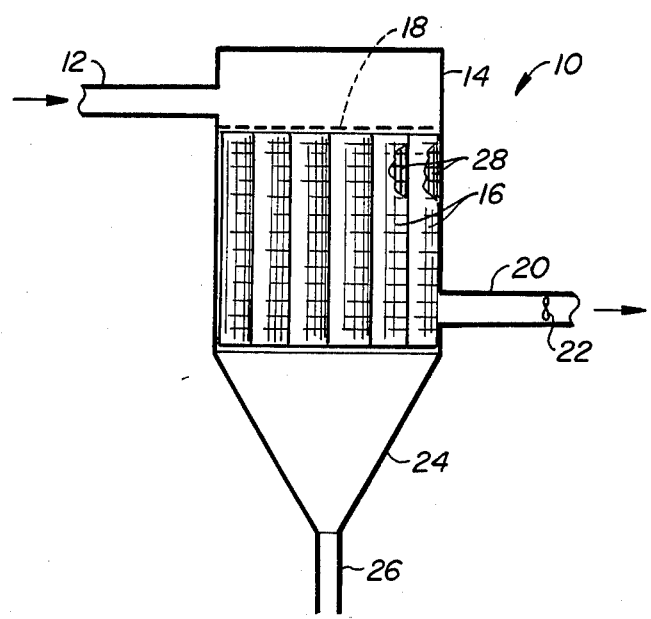
FIG.—1.
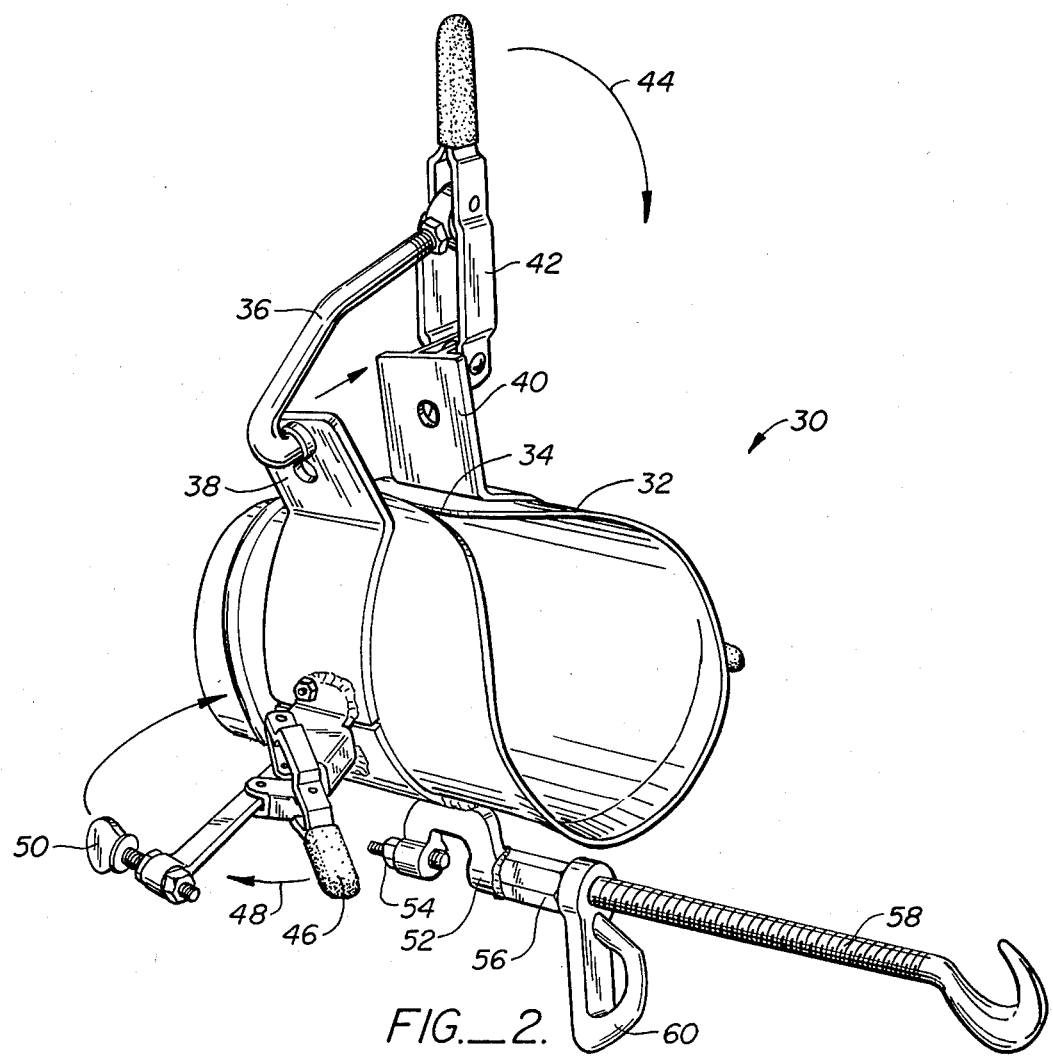
FIG.—2.

U.S. Patent Jul. 14, 1981 Sheet 2 of 2 4,277,874
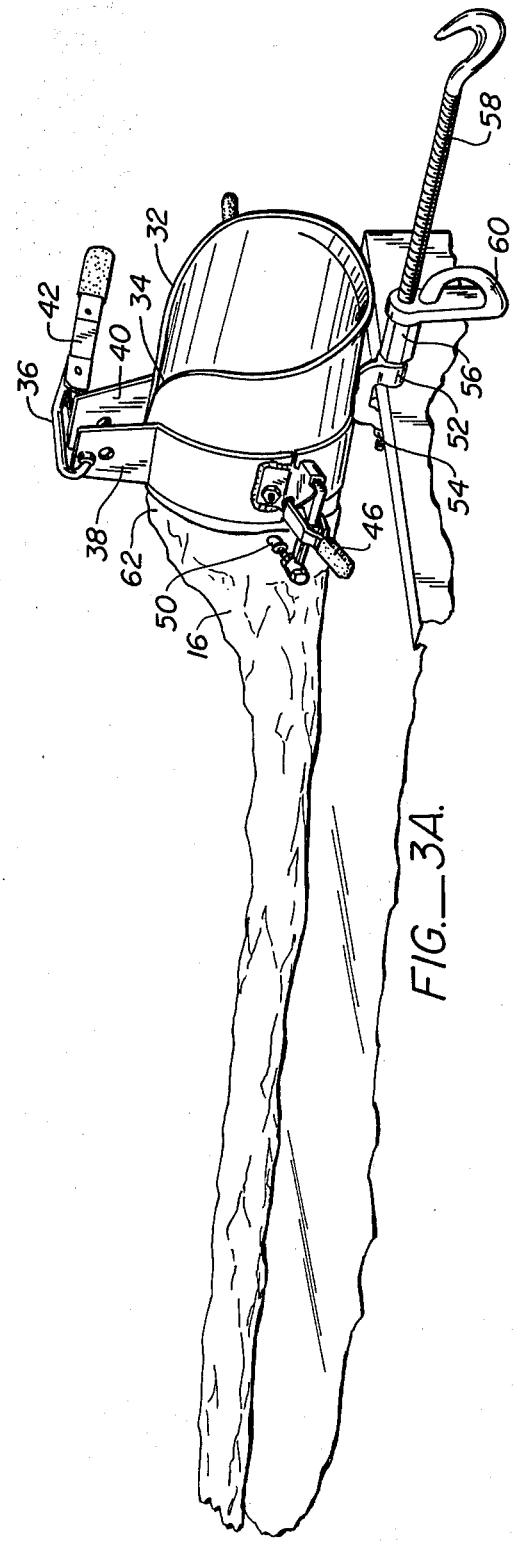
FIG._3A.
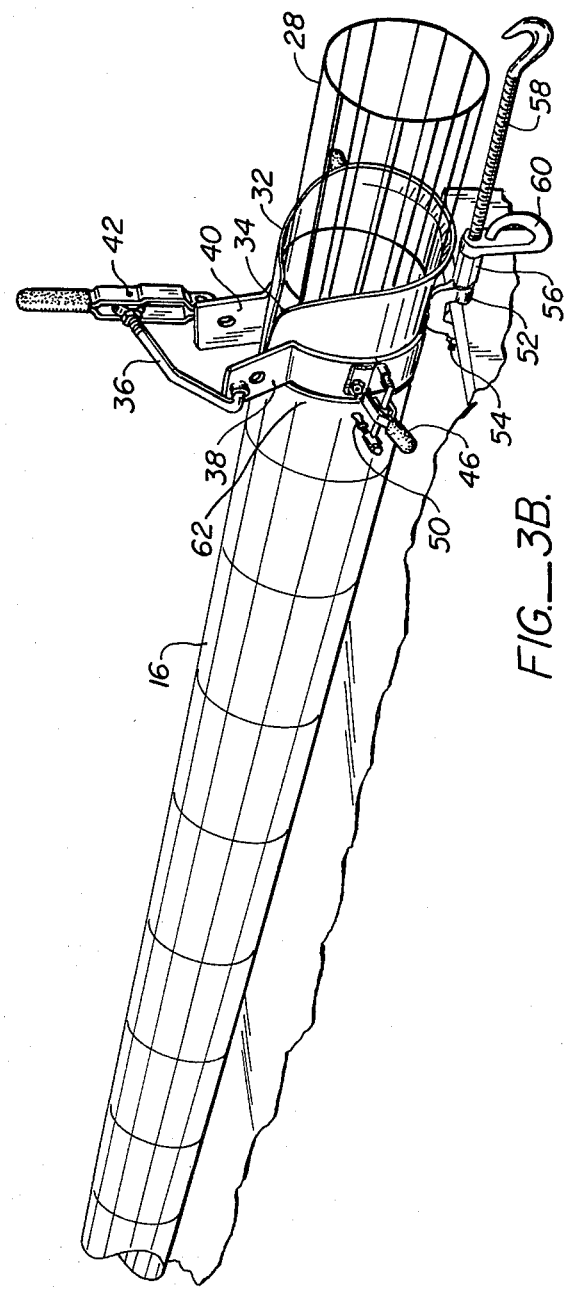
FIG._3B.

AIR FILTRATION BAG REPLACEMENT DEVICE

BACKGROUND OF THE INVENTION

The present invention relates to a device for holding a bag used in the filtration of airborne articles so that a frame can be inserted therein.

In many industrial and agricultural processes, a large amount of dust is generated, which represents both an environmental and safety hazard. Air filtration systems are often employed to remove such dust and other particulate matter from air. Such systems typically flow the air containing the particulate matter through a housing containing a plurality of porous filter bags which are open at each end. Air is drawn into the bags at their top end and drawn out of the bags through their sides, the particulate matter being trapped in the bags and falling to the bottom.

In air filtration systems of the type described above, frames must be inserted inside the filter bags so that they do not collapse. The bags themselves age quickly and must be frequently replaced, while the frames are reused. At the present time, replacement of the bags and reuse of the frames is done entirely by hand, and as a result, is relatively expensive. The expense of this procedure is becoming more and more critical as the use of such filtration procedures is mandated by government regulations and other considerations.

SUMMARY OF THE INVENTION

The present invention provides apparatus for facilitating the insertion of a cylindrical frame into a filter bag used for collecting airborne particulate matter. A cylindrical member is provided which has an axial discontinuity in its sidewalls. The outer diameter of the cylindrical member is at least equal to the inner diameter of the mouth of the bag. The inner diameter of the cylindrical member is no less than the outer diameter of the frame. A device is provided for drawing the sidewalls of the cylindrical member together at the discontinuity so that the outer diameter of the cylindrical member is decreased to slightly less than the inner diameter of the mouth of the bag. The mouth of the bag is then inserted over the end of the cylindrical member, which is released to capture the mouth of the bag. With the mouth of the bag held open by the apparatus of the present invention, the frame can readily be inserted through the other end of the cylindrical member.

The apparatus of the present invention greatly simplifies the replacement of filter bags used in air filtration systems. In the past, two people were generally required to remove the frame from an old bag and replace it in a new bag. The present invention allows this task to be performed by only one person in less time than two people could perform the task previously. As a result, the cost of complying with environmental and health regulations is greatly reduced.

The novel features which are characteristic of the invention, as to organization and method of operation, together with further objects and advantages thereof will be better understood from the following description considered in connection with the accompanying drawings in which a preferred embodiment of the invention is illsutrated by way of example. Is is to be expressly understood, however, that the drawings are for the purpose of illustration and description only and are not intended as a definition of the limits of the invention.

BRIEF DESCRIPTION OF THE DRAWINGS

FIG. 1 is a sectional view of an air filtration device utilizing a plurality of air filtration bags;

FIG. 2 is a perspective view of the preferred embodiment of the present invention used in the replacement of air filter bags;

FIGS. 3A and B are perspective views of the preferred embodiment of the present invention illustrating the use of the present invention to capture the mouth of the bag and facilitate the insertion of the frame respectively.

DESCRIPTION OF THE PREFERRED EMBODIMENT

An air filtration system 10 is illustrated generally by way of reference to FIG. 1. System 10 includes a conduit 12 for air containing airborne particulate matter opening into a housing 14. A plurality of filter bags 16 are hung vertically within housing 14 from a platform 18. An exhaust conduit 20 is located near the bottom of bag 16, and includes a fan 22 which draws air out of housing 14.

Air drawn into housing 14 through conduit 12 flows into the open mouths of bags 16. The air is drawn out of the bags through their porous sidewalls and exits housing 14 through conduit 20. Airborne particulate matter is captured within the bags, and falls through the open bottoms of the bags into a collection hopper 24. The collected particulate matter can be periodically removed through conduit 26.

In order for bags 16 to remain completely open, cylindrical wire frames 28 are located within the bags. Bags 16 periodically require replacement and/or cleaning, while wire frames 28 can simply be reused indefinitely. Accordingly, when bags 16 are replaced, wire frames 28 are removed and reinserted in the new or reconditioned bags.

Referring to FIG. 2, the present invention provides a device 30 which facilitates replacement of the filter bags. Device 30 includes a cylindrical member 32 having an axial slit or discontinuity 34. Generally speaking, the outer diameter of cylindrical member 32 is slightly larger than, or at least no less than, the inner diameter of the mouth of the filter bags.

A rod 36 spans discontinuity 34 and attaches to a plate 38 on one side of the discontinuity. A second plate 40 on the other side of discontinuity 34 has a lever 42 mounted thereon and attached to rod 36. Lever 42 can be manually actuated as illustrated by arrow 44 to draw plates 38, 40 toward one another and thus decrease the diameter of cylinder 32. When the diameter of cylinder 32 is decreased is this fashion, the edges of the cylinder at discontinuity 34 slightly overlap. In this configuration, the outer diameter of cylinder 32 is slightly less than the inner diameter of the mouth of the filter bags.

A pair of handles such as handle 46 are located on each side of cylinder 32. Handle 46 can be manually operated as illustrated by arrow 48 to bias an armature 50 against the side wall of cylindrical member 32.

A C-clamp 52 is located on the underside of cylindrical member 32. The screw portion 54 of clamp 52 projects into the center of the clamp to attach cylindrical member 32 to a fixed support. A threaded projection 56 on C-clamp 52 can be used to attach a hook 58. Lock nut 60 can be used to firmly attach hook 58 to projection 56.

The manner in which device 30 is used in the replacement of a filter bag is illustrated by way of reference to FIGS. 3A and 3B in combination. Initially, lever 42 is actuated to overlap the ends of cylindrical member 32 at discontinuity 34 (FIG. 3A). When lever 42 is fully actuated, it reaches an over-center position so that it will remain locked in its actuated position. As a result, the mouth 62 of bag 16 can readily be slipped over one end of cylindrical member 32.

With the mouth 62 of bag 16 in position over the end of cylindrical member 32, each handle 46 is actuated so that armatures 50 hold the mouth of the bag against the side of the cylindrical member. Once bag 16 is in position, lever 42 is released as illustrated in FIG. 3B and cylindrical member 32 springs outwardly to hold open the mouth of the bag.

With the mouth 62 of bag 16 firmly attached to one end of cylindrical member 32 and held open thereby, cylindrical frame 28 can readily be inserted into the bag through the opposite end of the cylindrical member. Cylindrical member 32 is tapered inwardly toward discontinuity 34 to provide a convenient ledge to assist in the insertion of frame 28.

Although not explicitly shown in the drawings, hook 58 is used to strip used bags from frame 28. One end of the frame is engaged by hook 58, and the bag can simply be pealed off. Thus, the hook provides a useful adjunct to the operation of the system as a whole.

While a preferred embodiment of the present invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for facilitating the insertion of the cylindrical frame into a filter bag having a circular mouth for collecting airborne particulate matter comprising:

a cylindrical member having an axial discontinuity in the side walls thereof, the outer diameter of the cylindrical member being at least equal to the inner diameter of the mouth of the bag and the inner diameter of the cylindrical member being no less than the outer diameter of the frame;

a rod spanning the discontinuity and attached to the cylindrical member at one side of the discontinuity;

a lever attached to the cylindrical member at the outer side of the discontinuity and coupled to the rod, said lever being manually actuatable to draw the side walls of the cylindrical member together to decrease the outer diameter of the cylindrical member to slightly less than the inner diameter of the mouth of the bag so that the mouth of the bag can be inserted over one end of the cylindrical member, said lever having a over-center locking position when the side walls of the cylindrical member have been drawn together; and means for clamping the mouth of the bag in position over one end of the cylindrical member so that the frame can be inserted into the bag through the other end of the cylindrical member after the release of the lever.

2. Apparatus as recited in claim 1 wherein said clamping means comprises a pair of handles and armatures disposed on opposite sides of the cylindrical member, said handles having an over-center position forcing the armatures to hold the mouth of the bag against the cylindrical member.

* * * * *